(12) United States Patent
Park et al.

(10) Patent No.: US 8,644,657 B2
(45) Date of Patent: Feb. 4, 2014

(54) METHOD OF TUNING RESONANCE WAVELENGTH OF RING RESONATOR

(75) Inventors: Sahnggi Park, Daejeon (KR); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 117 days.

(21) Appl. No.: 13/175,567

(22) Filed: Jul. 1, 2011

(65) Prior Publication Data
US 2012/0081197 A1 Apr. 5, 2012

(30) Foreign Application Priority Data
Oct. 1, 2010 (KR) .................. 10-2010-0095996

(51) Int. Cl.
*G02B 6/26* (2006.01)
*G02B 6/42* (2006.01)

(52) U.S. Cl.
USPC .............................................. 385/16; 385/32

(58) Field of Classification Search
USPC ................................. 385/32, 14, 16
See application file for complete search history.

(56) References Cited

U.S. PATENT DOCUMENTS

| | | | |
|---|---|---|---|
| 6,625,361 B2 | 9/2003 | Park et al. | |
| 6,766,083 B2 | 7/2004 | Bona et al. | |
| 7,595,010 B2* | 9/2009 | Chakravarti et al. ....... | 252/521.3 |
| 2002/0194876 A1* | 12/2002 | Bona et al. ................... | 65/386 |
| 2003/0123780 A1 | 7/2003 | Fischer | |
| 2004/0047532 A1* | 3/2004 | Evans ........................... | 385/11 |
| 2004/0114867 A1 | 6/2004 | Nielsen et al. | |
| 2008/0166095 A1* | 7/2008 | Popovic et al. ............... | 385/126 |
| 2008/0175538 A1* | 7/2008 | Chu et al. ..................... | 385/30 |
| 2008/0253728 A1* | 10/2008 | Sparacin et al. ............. | 385/132 |

FOREIGN PATENT DOCUMENTS

| | | |
|---|---|---|
| JP | 3311722 B2 | 5/2002 |
| JP | 2006-506689 A | 2/2006 |

OTHER PUBLICATIONS

S. Park et al., "Coating a thin metal electrode on a fiber to induce nonlinearity by poling it", Optical Fiber Technology, 2005, pp. 225-265, vol. 11, Elsevier Inc.
Fengnian Xia et al., "Ultra-compact high order ring resonator filters using submicron silicon photonic wires for on-chip optical interconnects", Optics Express, Sep. 5, 2007, pp. 11934-11941, vol. 15, No. 19, Optical Society of America.
S. Park et al., "Frequency doubling of 1549 nm, 3 ns pulse using all-fibre system", Electronics Letters, Jan. 23, 2003, pp. 194-195, vol. 39, No. 2.
Toshiki Naganawa et al., "UV-Induced Refractive Index Change of SiN Film and Its Application to Center Wavelength Trimming of Vertically Coupled Microring Resonator Filter", Japanese Journal of Applied Physics, Aug. 25, 2004, pp. 5780-5784, vol. 43, No. 8B, The Japan Society of Applied Physics.
T. Fujiwara et al., "Electro-optic modulation in germanosillicate fibre with UV-excited poling", Electronics Letters, Mar. 30, 1995, pp. 573-575, vol. 31, No. 7, IEE.

* cited by examiner

*Primary Examiner* — Ryan Lepisto
*Assistant Examiner* — Robert Tavlykaev (57) ABSTRACT

Provided is a method of tuning a resonance wavelength of a ring resonator. The method of tuning the resonance wavelength of a ring resonator includes preparing a ring resonator which contains a ring waveguide and a dielectric layer covering the ring waveguide, and heating the ring resonator to induce a refractive index phase change of the dielectric layer.

12 Claims, 10 Drawing Sheets

METHOD OF TUNING RESONANCE WAVELENGTH OF RING RESONATOR

CROSS-REFERENCE TO RELATED APPLICATIONS

This U.S. non-provisional patent application claims priority under 35 U.S.C. §119 of Korean Patent Applications No. 10-2010-0095996, filed on Oct. 1, 2010, the entire contents of which are hereby incorporated by reference.

BACKGROUND

The present disclosure herein relates to an optical communication device, and more particularly, to a method of tuning a resonance wavelength of a ring resonator.

According to the miniaturization and high-speed trends of electronic devices, researches are continuing in order to increase the integration density of components which constitute the electronic devices. For the miniaturization and high-speed operation of the electronic devices, a rapid signal transmission between the components is required together with the miniaturization of the components.

As a way of rapid signal transmission between the components, an application of optical communication technologies to electronic devices is being attempted. In the case where the optical communication technologies are applied to the electronic devices, the signal transmission can be performed at higher speed and the disadvantages of a related art signal transmission method such as high resistance, high-heat generation and parasitic capacitance phenomenon, etc., can be mitigated.

The essential optical devices for applying the optical communication technologies to a silicon-based semiconductor chip may include a silicon-based optical switch, an optical modulator, a multiplexer (MUX)/demultiplexer (DEMUX) filter and the like, in addition to a light source and an optical detector. Although the roles and functions of the optical switch, the optical modulator and the MUX/DEMUX filter among these are different, there are many cases where the core manufacturing technologies are shared or the same device is applied differently. For example, in the case of a ring resonator, it can be applied to all of the above three devices such that active researches are in progress.

Particularly, in order to achieve a multi-core central processing unit (CPU) which is one of the goals of silicon photonics research, a common opinion of scholars is that the following key difficult problems of a ring resonator should be solved. First, the statistical errors of resonance wavelength, which essentially occurs during the manufacturing process of the ring resonator, should be minimized. Second, a tuning method should exist to match the resonance wavelengths, when the resonance wavelengths between more than two ring resonators should be matched to each other in the semiconductor chip with a plurality of ring resonators. Third, a photolithography process is able to manufacture the minimum gap between a ring waveguide and a bus line or a ring waveguide and a ring waveguide.

SUMMARY

The present disclosure provides a method of tuning a resonance wavelength of a ring resonator with improved operating characteristics.

Embodiments of the inventive concept provide a method of tuning a resonance wavelength of a ring resonator, the method including: preparing a ring resonator containing a ring waveguide and a dielectric layer covering the ring waveguide; and heating the ring resonator to induce a refractive index phase change of the dielectric layer.

In some embodiments, a temperature of the refractive index phase change is determined by a deposition temperature of the dielectric layer.

In other embodiments, the ring waveguide includes silicon, and the dielectric layer at least may include a cladding dielectric layer covering upper and lower surfaces of the ring waveguide, and a first subsidiary dielectric layer covering an upper surface of the ring waveguide and disposed between the cladding dielectric layer and the ring waveguide.

In still other embodiments, the cladding dielectric layer includes a silicon oxide layer, and the first subsidiary dielectric layer may include a silicon oxynitride layer ($SiO_xN_y$).

In even other embodiments, the first subsidiary dielectric layer may cover upper and side surfaces of the ring waveguide.

In yet other embodiments, the dielectric layer may further include a second subsidiary dielectric layer covering the upper surface of the ring waveguide and disposed between the first subsidiary dielectric layer and the ring waveguide, wherein the second subsidiary dielectric layer may include a silicon nitride layer.

In further embodiments, the ring waveguide includes a plurality of ring waveguides, and any one of the plurality of ring waveguides is heated to change a resonance wavelength, and a temperature and a resonance wavelength of another one of the plurality of ring waveguides are maintained constantly.

In still further embodiments, the ring waveguide allows light of a TM mode to move.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION OF THE EMBODIMENTS

The above objects, other objects, features and advantages of the present invention will be better understood from the following description of preferred embodiments taken in conjunction with the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the specification, it will be understood that when one element is referred to as being 'on' another element, it can be directly on the other element, or intervening elements may also be present. In the figures, moreover, the dimensions of elements are exaggerated for clarity of illustration. Like reference numerals refer to like elements throughout.

The embodiments in the detailed description will be described with sectional views and/or plan views as ideal exemplary views of the inventive concept. In the drawings, the dimensions of layers and regions are exaggerated for clarity of illustration. Areas exemplified in the drawings have general properties, and are used to illustrate a specific shape of a device region. Thus, this should not be construed as limited to the scope of the inventive concept. It will be understood that although the terms first, second and third are used herein to describe various elements, these elements should not be limited by these terms. These terms are only used to distinguish one element from another element. An embodiment described and exemplified herein includes a complementary embodiment thereof.

While specific terms were used in the specification, they were not used to limit the inventive concept, but merely used to explain the exemplary embodiments. In the inventive concept, the terms of a singular form may include plural forms unless otherwise specified. The meaning of "include," "comprise," "including," or "comprising," specifies a property, a region, a fixed number, a step, a process, an element and/or a component but does not exclude other properties, regions, fixed numbers, steps, processes, elements and/or components.

Two important phenomena are first discovered from researches and experiments performed by the present inventors. It is considered that these will be an important key to solve three difficult problems of a ring resonator described above.

The first phenomenon may reduce the statistical errors of resonance wavelength by more than two times in the case of using the lowest order of a transverse magnetic (TM) mode. Also, the minimum gap between the ring waveguide and the bus line or the ring waveguide and the ring waveguide may be made more than about 400 nm such that the ring resonator can be manufactured by the photolithography process.

The second phenomenon is that a refractive index phase change phenomenon is observed in the case where a temperature of a silicon oxynitride ($SiO_xN_y$) layer, which was deposited by a plasma enhanced chemical vapor deposition (PECVD) equipment at a specific temperature, is increased by further heating. Herein, the refractive index phase change phenomenon denotes a phenomenon in which the change of refractive index is almost absent or very small below a deposition temperature, but, in contrast, the refractive index increases very much above the deposition temperature. This means that the resonance wavelength of the ring resonator may be easily and precisely changed when inserting the silicon oxynitride layer to an upper cladding layer of a waveguide.

Based on this research, a method of tuning a resonance wavelength of a ring resonator according to the embodiments of the inventive concept will be described below.

Figure 1A:
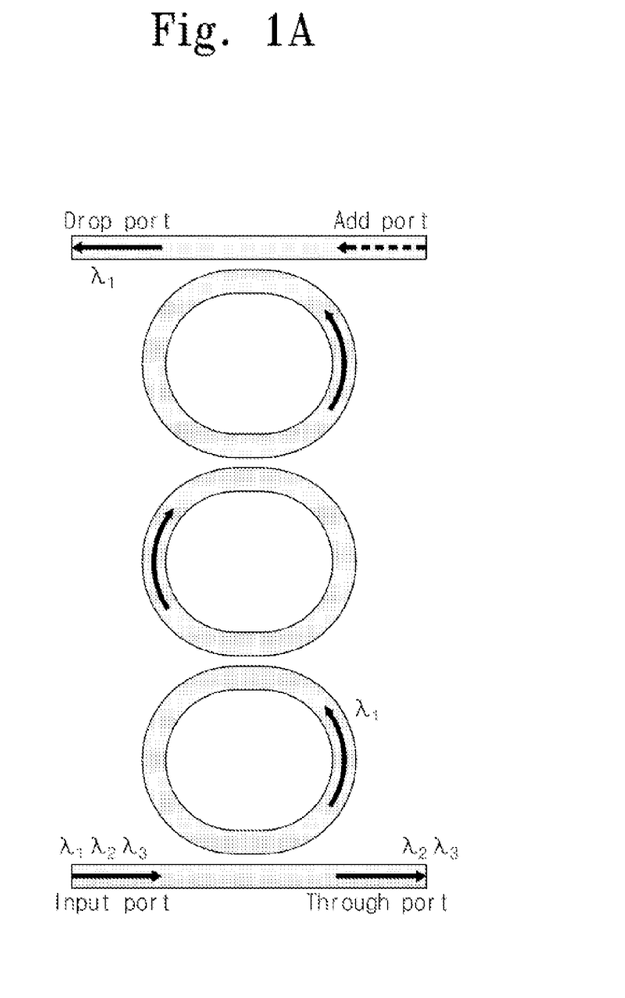
FIGS. 1A and 1B are drawings of $3^{rd}$ order and $1^{st}$ order ring resonators conceptually illustrating a multi-channel filter or an add-drop switch.
Figure 1B:
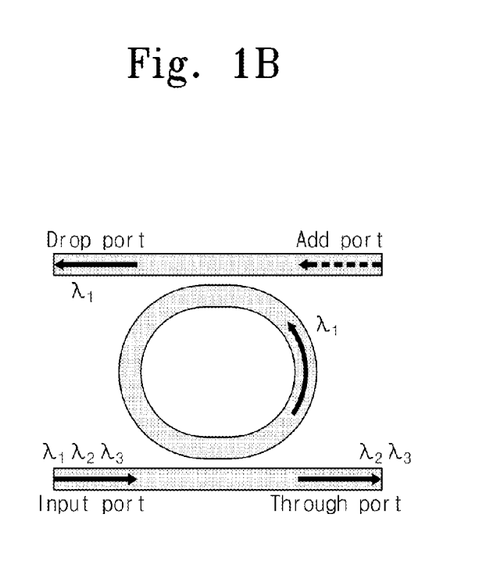

FIGS. 1A and 1B are drawings of $3^{rd}$ order and $1^{st}$ order ring resonators conceptually illustrating a multi-channel filter or an add-drop switch.

Referring to FIGS. 1A and 1B, when signals of a plurality of channels are inputted to an input port, if a wavelength of channel 1 ($\lambda_1$) matches with a resonance wavelength of a ring resonator, and a wavelengths of channels 2 and 3 ($\lambda_2$ and $\lambda_3$) do not match with the resonance wavelength, a signal of channel 1 is outputted from a drop port via ring(s) and signals of channels 2 and 3 are transmitted to a through port. This configuration allows the ring resonator to function as a demultiplexer (DEMUX). Also, on the contrary, when the $\lambda_1$ signal is inputted to an add port and the $\lambda_2$ and $\lambda_3$ signals are inputted to the through port, this configuration allows the ring resonator to function as a multiplexer (MUX) by which $\lambda_1$, $\lambda_2$ and $\lambda_3$ are outputted from the input port. If the resonance wavelength of one among three rings is changed, the signal of channel 1 may be changed from the add port to the through port or from the input port to the drop port. This means that the ring resonator may function as an add-drop switch. In addition, when the resonance wavelength of one among three rings is modulated over time, the ring resonator may function as a modulator and the experiments prove that a modulation rate is more than about 10 GHz.

Figure 2A:
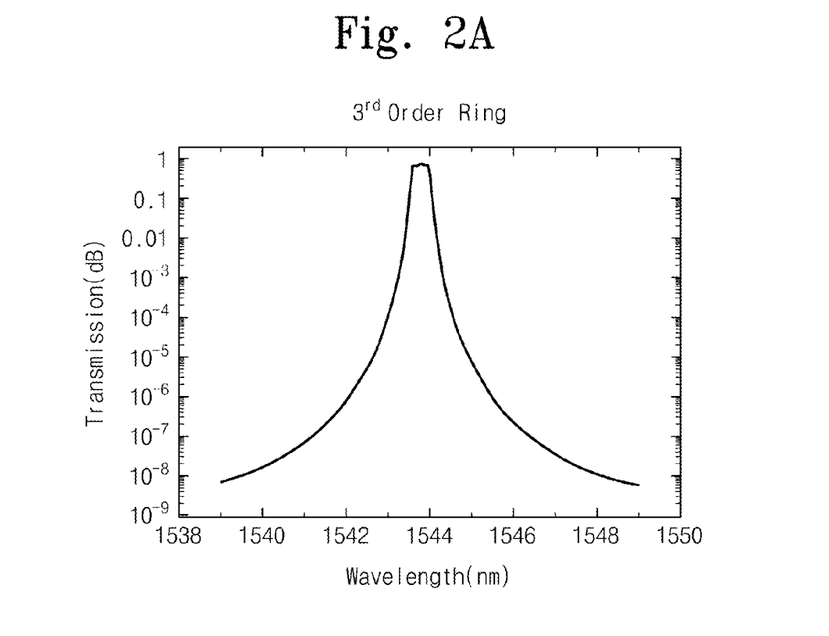
FIGS. 2A and 2B are graphs showing spectrum characteristics of $3^{rd}$ order and $1^{st}$ order ring resonators.
Figure 2B:
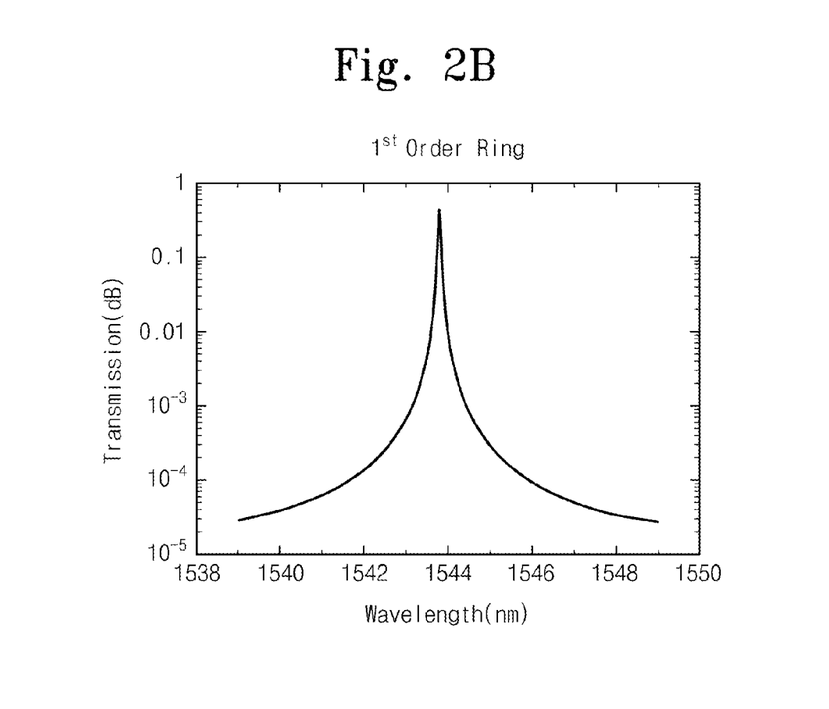

FIGS. 2A and 2B are graphs showing spectrum characteristics of $3^{rd}$ order and $1^{st}$ order ring resonators.

Referring to FIGS. 2A and 2B, a $1^{st}$ order ring resonator may have the same function as a $3^{rd}$ order ring resonator. However, spectrum characteristics of the $3^{rd}$ order ring resonator are far superior. The most important characteristics of a filter, a cross talk with adjacent channels and a flat-top spectral shape, will be superior as the order of a ring resonator is higher. However, since resonance wavelengths of the serially connected rings should match exactly with each other, a process will be extremely difficult as the order of the ring resonator is higher. In particular, a mismatch of resonance wavelength shows statistical characteristics such that it is impossible to match completely.

Figure 3A:
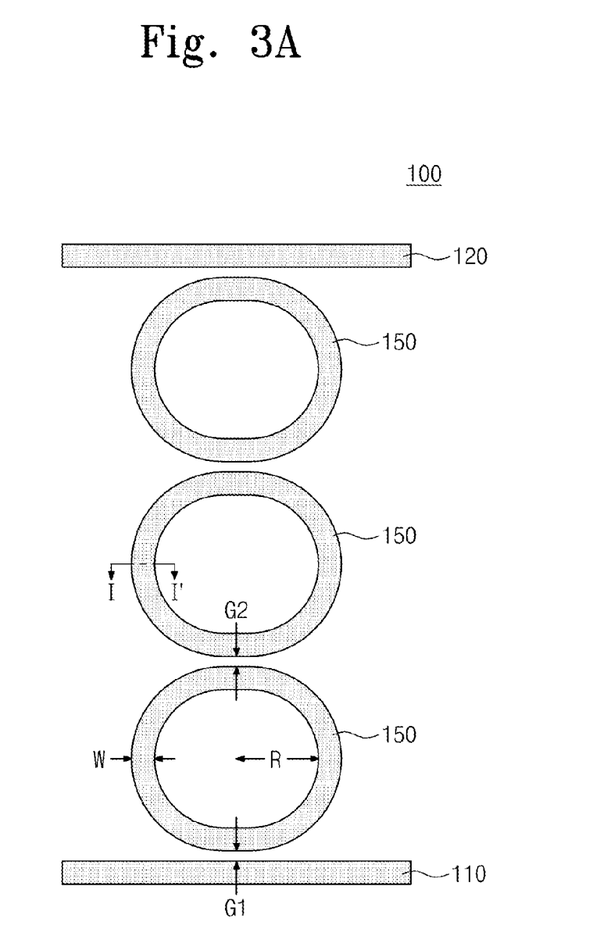
FIG. 3A is a drawing illustrating specific design values for a $3^{rd}$ order ring.
Figure 3B:
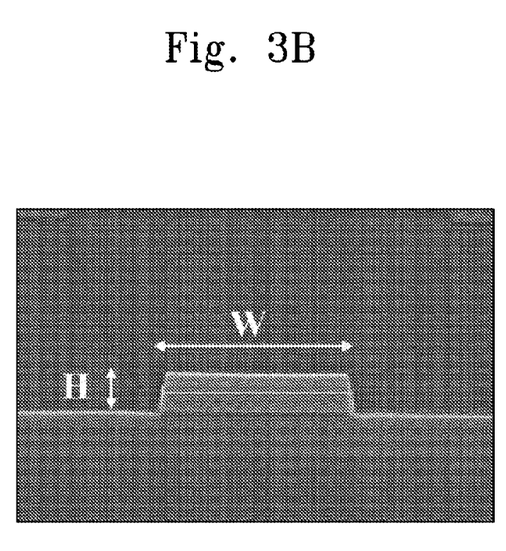
FIG. 3B is a scanning electron microscope (SEM) micrograph taken along line I-I' of FIG. 3A.

FIG. 3A is a drawing illustrating specific design values for a $3^{rd}$ order ring, and FIG. 3B is a scanning electron microscope (SEM) micrograph taken along line I-I' of FIG. 3A.

Referring to FIGS. 3A and 3B, a $3^{rd}$ order ring resonator 100 includes a first port 110, a second port 120 and three ring waveguides 150 arranged between the first port 110 and second port 120. As described in FIG. 1A, the first port 110 may include an input port and a through port, and the second port 120 may include a drop port and an add port.

The width W and height H of each of the ring waveguides 150 are about 1 mm and about 190 nm, respectively, and a gap G1 of a coupling region is about 400 nm and a gap G2 between the ring waveguides 150 is about 600 nm, and a radius of the ring waveguide 150 is about 9 mm. A light passing through the ring waveguide 150 uses a transverse magnetic (TM) mode. The ring waveguide 150 may be formed using the Hg I-line photolithography process. The values described herein are experimentally optimized values for obtaining a good transmission spectrum. However, a relatively good transmission spectrum may also be obtained from the values which considerably deviate from these values. For example, a good transmission spectrum may be obtained by appropriate combinations of the ranges in which the width W of the ring waveguide 150 is about 0.5-1.5 μm, the height H of the ring waveguide 150 is about 100-350 nm, and the gap G1 between the ring waveguides 150 and the first and second ports 110 and 120, and the gap G2 between the ring waveguides 150 are about 200 nm-1 mm. Also, the radius R of the ring waveguide 150 may be more than 5 μm.

Figure 4A:
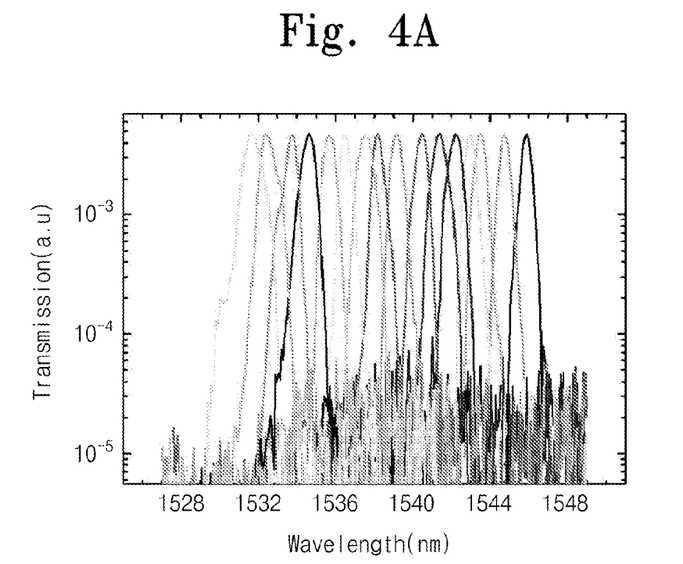
FIGS. 4A and 4B are graphs showing 16-channel and 32-channel transmission spectrums when a $3^{rd}$ order ring resonator is used as a filter.
Figure 4B:
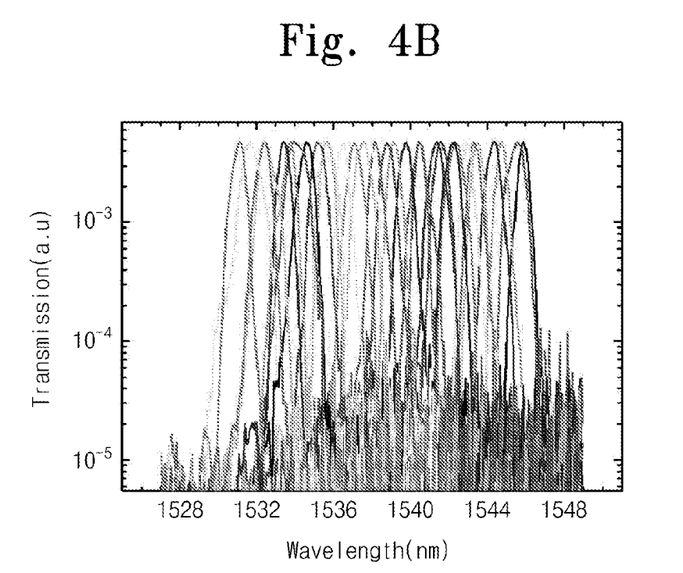

FIGS. 4A and 4B are graphs showing 16-channel and 32-channel transmission spectrums when a $3^{rd}$ order ring resonator is used as a filter.

Referring to FIGS. 4A and 4B, it can be understood that a $3^{rd}$ order ring resonator with the experimentally optimized values in FIGS. 3A and 3B exhibits considerably superior filter characteristics with respect to 16-channel and 32-channel.

The excellent spectrum characteristics presented in FIGS. 4A and 4B are only possible if an optical waveguide is designed such that a light moves only in the lowest order of a TM mode. In most of the ring resonators which have been reported in the articles so far, their optical waveguides are designed to have the lowest order of a transverse electric (TE) mode. In the case of the TE mode, the light is more strongly condensed at a core of the optical waveguide as compared to the TM mode so that the bending loss will be small. Therefore, there are advantages that the ring resonator with a much smaller radius can be achieved and a thickness of a cladding layer can be made much smaller.

However, the light is strongly condensed at the core of the optical waveguide so that the statistical wavelength errors caused by manufacturing processes are rather very large, and since a gap for an optical connection between a ring and a bus line or a ring and a ring should be small, there is a disadvantage that electron-beam lithography should be used. These two disadvantages are being the most difficult problems of silicon photonics research.

From the research performed by the present inventors, it was experimentally found that the above disadvantages may be overcome when the optical waveguide and the ring resonator are properly designed by using the TM mode. That is, the statistical wavelength errors caused by manufacturing processes are reduced more than two times and the radius of the ring is also about 9 mm which is an acceptable size, and ring filters of 16-channel with 100 GHz channel spacing and 32-channel with 50 GHz channel spacing are manufactured, and the excellent filter spectrums are measured as shown in FIGS. 4A and 4B. Also, the minimum gap between the ring and the bus line or the ring and the ring can be more than about 400 nm. Therefore, a 32-channel MUX/DEMUX ring filter can be manufactured by the Hg I-line photolithography process. Specifically, referring to FIGS. 3A and 3B, the dimensions of ring filters of 16-channel with 100 GHz channel spacing and 32-channel with 50 GHz channel spacing may be specified that the width W and height H of the ring waveguide 150 are about 1.0 μm and about 190-200 nm, respectively, and the gap G1 between the ring waveguides 150 and the first and second ports 110 and 120 is about 400-700 nm, and the radius R of the ring waveguide 150 is about 8-10 μm.

Figure 5A:
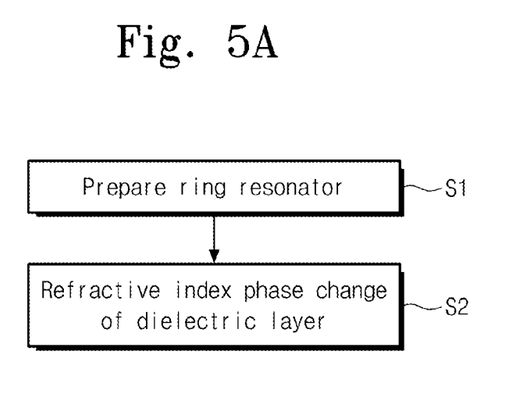
FIG. 5A is a flowchart illustrating a method of tuning a resonance wavelength of a ring resonator according to an embodiment of the inventive concept.

FIG. 5A is a flowchart illustrating a method of tuning a resonance wavelength of a ring resonator according to an embodiments of the inventive concept.

Referring to FIG. 5A, in operation S1, a ring resonator, which includes a ring waveguide and a dielectric layer covering the ring waveguide, is prepared. The specific structure of the ring waveguide and the dielectric layer will be described below with reference to FIGS. 5B and 5C. In operation S2, a refractive index phase change of the dielectric layer is induced by heating the ring resonator. The heating of the ring resonator includes preliminarily heating of the ring resonator below the deposition temperature of the dielectric layer, and heating any one of a plurality of ring waveguides to a temperature above the deposition temperature of the dielectric layer. That is, a temperature of the refractive index phase change may be determined by the deposition temperature of the dielectric layer. The ring waveguide includes a plurality of ring waveguides, and the refractive index phase change may be induced by heating the specific one of the plurality of ring waveguides.

Figure 5B:
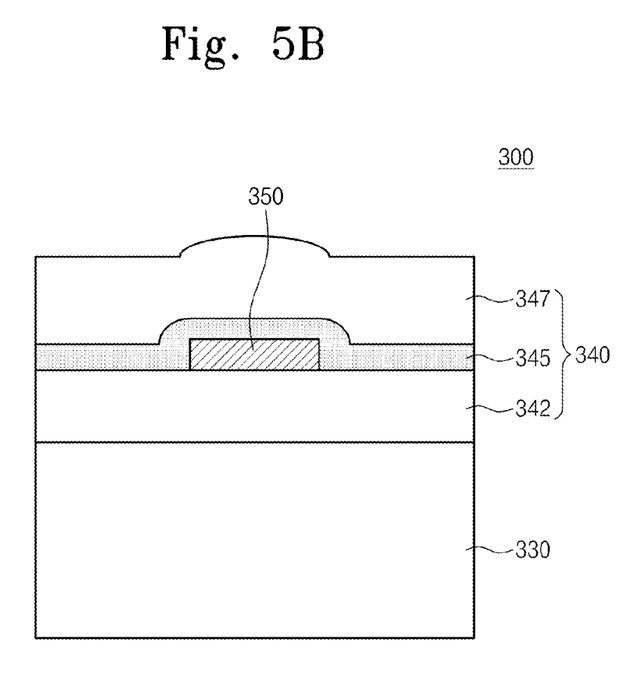
FIGS. 5B and 5C are cross-sectional views illustrating ring resonators according to embodiments of the inventive concept.
Figure 5C:
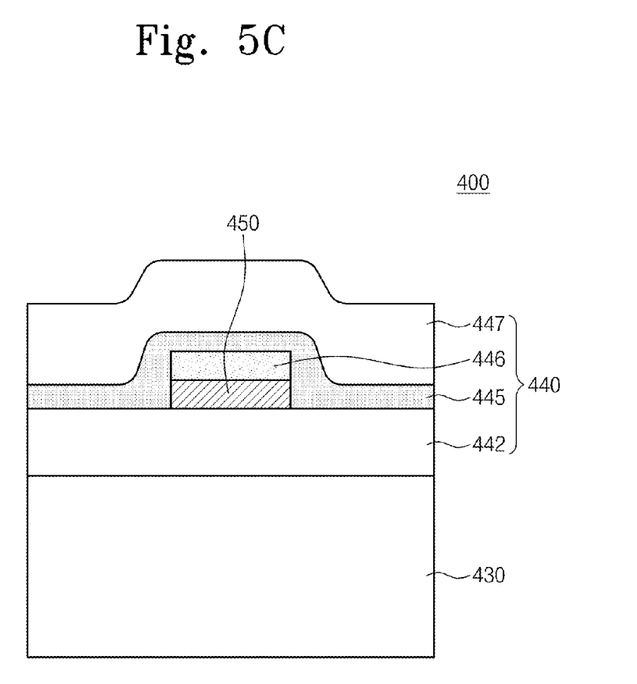

FIG. 5B is a cross-sectional view illustrating a ring resonator according to an embodiment of the inventive concept, and FIG. 5C is a cross-sectional view illustrating a ring resonator according to another embodiment of the inventive concept. FIGS. 5B and 5C are cross-sectional views taken along line I-I' of FIG. 3A.

Referring to FIG. 5B, a ring resonator 300 includes a lower cladding dielectric layer 342 on a substrate 330, a ring waveguide 350 on the lower cladding dielectric layer 342, a first subsidiary dielectric layer 345 covering the ring waveguide 350 and the lower cladding dielectric layer 342, and an upper cladding dielectric layer 347 on the first subsidiary dielectric layer 345. The lower cladding dielectric layer 342, the first subsidiary dielectric layer 345 and the upper cladding dielectric layer 347 may constitute a dielectric layer 340.

The lower cladding dielectric layer 342 and the upper cladding dielectric layer 347 may include a silicon oxide layer. The ring waveguide 350 may include silicon. The first subsidiary dielectric layer 345 may include a silicon oxynitride layer or a silicon nitride layer.

The first subsidiary dielectric layer 345 may be disposed to cover the upper and side surfaces of the ring waveguide 350. Therefore, an optical signal via the ring resonator 300 may be more affected by the refractive index phase change of the first subsidiary dielectric layer 345.

Referring to FIG. 5C, a ring resonator 400 includes a lower cladding dielectric layer 442 on a substrate 430, a ring waveguide 450 on the lower cladding dielectric layer 442, a first subsidiary dielectric layer 445 covering the ring waveguide 450 and the lower cladding dielectric layer 442, a second subsidiary dielectric layer 446 covering an upper surface of the ring waveguide 450 and disposed between the first subsidiary dielectric layer 445 and the ring waveguide 450, and an upper cladding dielectric layer 447 on the first subsidiary dielectric layer 445. The lower cladding dielectric layer 442, the first subsidiary dielectric layer 445, the second subsidiary dielectric layer 446 and the upper cladding dielectric layer 447 may constitute a dielectric layer 440.

The lower cladding dielectric layer 442 and the upper cladding dielectric layer 447 may include a silicon oxide layer. The ring waveguide 450 may include silicon. The first subsidiary dielectric layer 445 may include a silicon oxynitride layer. The second subsidiary dielectric layer 446 may include a silicon nitride layer.

Figure 6A:
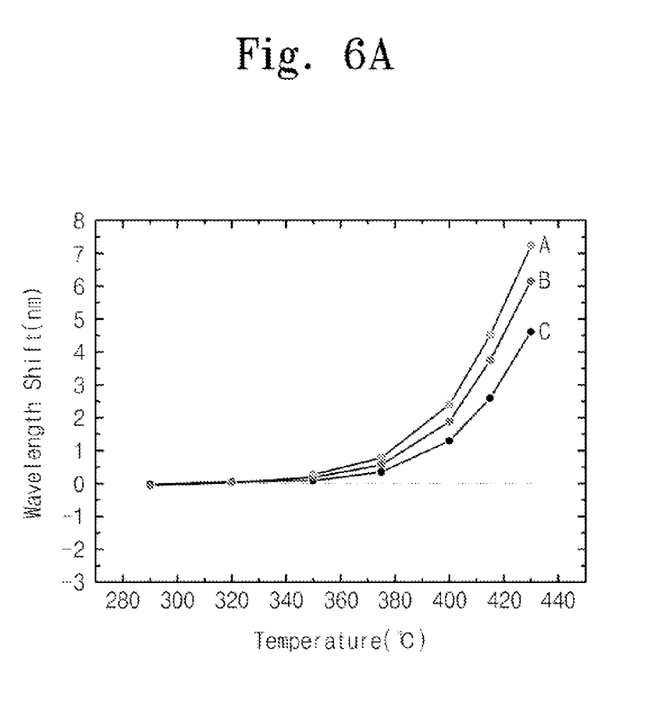
FIG. 6A is a graph showing a change of resonance wavelength depending on a temperature of a ring resonator according to an embodiment of the inventive concept.
Figure 6B:
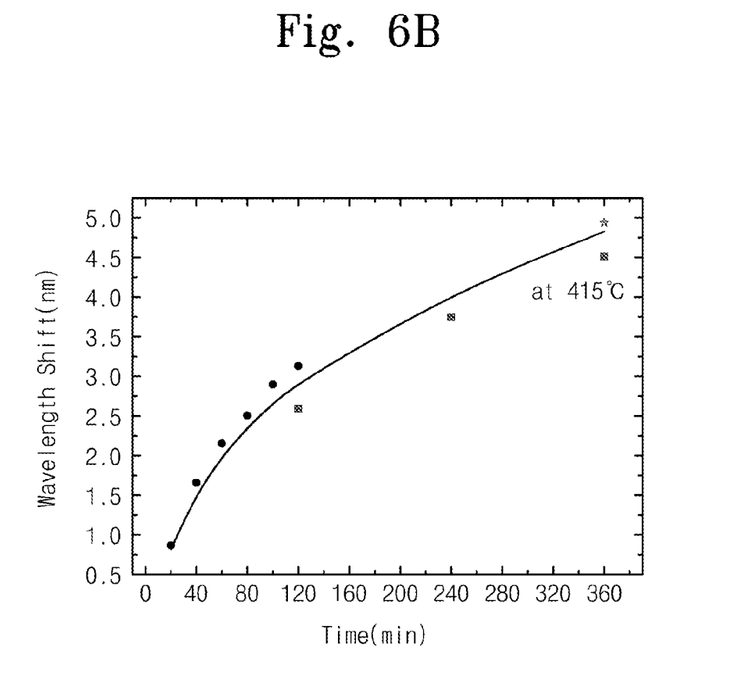
FIG. 6B is a graph showing the change of resonance wavelength with respect to a heating time at a specific temperature.

FIG. 6A is a graph showing a change of resonance wavelength depending on the temperature of a ring resonator according to an embodiment of the inventive concept, and FIG. 6B is a graph showing the change of resonance wavelength with respect to a heating time at a specific temperature.

A resonance wavelength change according to a temperature of a ring resonator shown in FIG. 6A is caused by a refractive index phase change according to a temperature of a silicon oxynitride layer, and this is the first discovered phenomenon in the present researches. The respective samples A, B and C have different heating time from each other, wherein a heating time of sample A is longer than that of sample B, and a heating time of sample B is longer than that of sample C. A silicon oxynitride ($SiO_xN_y$) layer may have a refractive index value ranging from n=1.45, a refractive index of a silicon oxide ($SiO_2$) layer to n=2.0, a refractive index of a silicon nitride ($Si_3N_4$) layer depending on the concentration ratio of oxygen and nitrogen. In the present researches, the silicon oxynitride ($SiO_xN_y$) layer is used for the first subsidiary dielectric layer 345 in the waveguide structure like FIG. 5B, and the temperature characteristics of the resonance wavelength of the ring resonator are measured. The lower cladding layer 342 is a silicon oxide ($SiO_2$) layer of a silicon on insulator (SOI) substrate, and the first subsidiary dielectric layer 345 and the upper cladding layer 347 are a silicon oxynitride ($SiO_xN_y$) layer and a silicon oxide ($SiO_2$) layer deposited by a plasma enhanced chemical vapor deposition (PECVD) equipment at about 400° C., respectively.

The results, which are obtained by measuring the resonance wavelength at each temperature while heating a multichannel ring resonator to about 430° C. by a heater, show useful characteristics like in FIG. 6A. The resonance wavelength change is not observed below about 300° C. and the resonance wavelength begins to move slowly to a longer wavelength at about 300-400° C., and the resonance wavelength increases steeply to a longer wavelength at about 400° C.

As the result of performing the same experiment after replacing the silicon oxynitride ($SiO_xN_y$) layer with the silicon oxide ($SiO_2$) layer deposited by the PECVD at about 400° C., the resonance wavelength movement is not observed at all. As the result of experiments, it can be understood that the silicon oxynitride ($SiO_xN_y$) layer shows a refractive index phase change phenomenon in which the refractive index increases rapidly at the deposition temperature. As the result of performing the same experiment after depositing the silicon oxynitride ($SiO_xN_y$) layer at about 300° C., it is also observed a phenomenon in which the refractive index of the silicon oxynitride ($SiO_xN_y$) layer increases largely at about 300° C. But, the increasing rate of refractive index in the case of depositing at about 400° C. shows larger value than that in the case of depositing at about 300° C.

FIG. 6B shows the change of resonance wavelength with respect to a heating time after holding a temperature of a heater at about 415. It can be understood that the increasing rate of refractive index is large at the beginning of heating and the increasing rate of refractive index lowers over time.

The experimental results presented in FIGS. 6A and 6B may not only be very usefully applied to a silicon resonator, but also to all silicon waveguides having wavelength dependency on the waveguide light. These indicate that the resonance wavelength can always accurately return to its original position by heating the manufactured device when the silicon oxynitride ($SiO_xN_y$) layer is inserted into a cladding layer and the resonance wavelength deviates from a fixed value to the direction of a low refractive index value.

When trying to change only the resonance wavelength of a specific ring resonator with respect to the chip containing a plurality of ring resonators, after heating the entire chip to about 300-350, the specific ring resonator is heated by laser or a tip of a heated needle and the like, thereby enabling to change the resonance wavelength of the corresponding ring. At this time, it can be understood that the change of resonance wavelength may not be shown for the ring resonator in the position farther than the distance having about 50-100° C. of temperature slope.

According to the embodiments of the inventive concept, a resonance wavelength of a ring resonator can be changed by inducing a refractive index phase change phenomenon of a dielectric layer. The refractive index phase change phenomenon is determined by a deposition temperature of the dielectric layer such that the resonance wavelength of the ring resonator can be effectively tuned by heating a specific ring waveguide above the deposition temperature of the dielectric layer.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A method of tuning a resonance wavelength of a ring resonator, the method comprising:
   preparing the ring resonator including a ring waveguide and a dielectric layer covering the ring waveguide, the dielectric layer being deposited at a deposition temperature; and
   heating the ring resonator to a first temperature, the first temperature being lower than the deposition temperature; and
   heating the ring resonator to a second temperature, the second temperature being higher than the first temperature to induce a refractive index phase change of the dielectric layer,
   wherein a refractive index of the dielectric layer remains substantially the same below the first temperature.

2. The method of claim 1, wherein the ring waveguide comprises silicon, and
   wherein the dielectric layer at least comprises upper and lower cladding dielectric layers covering upper and lower surfaces of the ring waveguide, respectively, and a first subsidiary dielectric layer covering an upper surface of the ring waveguide, the first subsidiary dielectric layer being disposed between the upper cladding dielectric layer and the ring waveguide.

3. The method of claim 2, wherein the upper and lower cladding dielectric layers comprise a silicon oxide layer, and the first subsidiary dielectric layer comprises a silicon oxynitride layer ($SiO_xN_y$).

4. The method of claim 2, wherein the first subsidiary dielectric layer covers upper and side surfaces of the ring waveguide.

5. The method of claim 2, wherein the dielectric layer further comprises a second subsidiary dielectric layer covering the upper surface of the ring waveguide and disposed between the first subsidiary dielectric layer and the ring waveguide.

6. The method of claim 1, wherein the ring waveguide comprises a plurality of ring waveguides, and
   wherein any one of the plurality of ring waveguides is heated to the second temperature to change a resonance wavelength, and a temperature and a resonance wavelength of another one of the plurality of ring waveguides are maintained constantly.

7. The method of claim 1, wherein the ring waveguide allows light of a transverse magnetic (TM) mode to be switched.

8. The method of claim 5, wherein the second subsidiary dielectric layer comprises a silicon nitride layer.

9. The method of claim 3, wherein the first subsidiary dielectric layer is deposited using a plasma enhanced chemical vapor deposition (PECVD).

10. The method of claim 9, wherein the PECVD is performed at the deposition temperature around 400° C.

11. The method of claim 10, wherein the first temperature is around 300° C.

12. A method of tuning a resonance wavelength of a ring resonator, the method comprising:

preparing the ring resonator including a ring waveguide and a dielectric layer covering the ring waveguide, the dielectric layer being deposited at a deposition temperature;

heating the ring resonator to a first temperature, the first temperature being lower than the deposition temperature; and heating the ring waveguide of the ring resonator to a second temperature, the second temperature being higher than the first temperature to induce a refractive index phase change of the dielectric layer, wherein a refractive index of the dielectric layer remains substantially the same below the first temperature, wherein the ring waveguide comprises silicon, and wherein the dielectric layer comprises upper and lower cladding dielectric layers covering upper and lower surfaces of the ring waveguide, respectively, and a first subsidiary dielectric layer covering an upper surface of the ring waveguide and an entire upper surface of the lower cladding dielectric layer, the first subsidiary dielectric layer being disposed between the upper cladding dielectric layer and the ring waveguide.

\* \* \* \* \*